United States Patent [19]
Langenberg

[11] Patent Number: 4,623,057
[45] Date of Patent: Nov. 18, 1986

[54] APPARATUS FOR FEEDING SINGLED DISC-SHAPED ELEMENTS

[75] Inventor: Josef Langenberg, Ascheberg-Herbern, Fed. Rep. of Germany

[73] Assignee: Firma Magnettechnik NSM GmbH, Fed. Rep. of Germany

[21] Appl. No.: 655,032

[22] Filed: Sep. 26, 1984

[30] Foreign Application Priority Data

Oct. 5, 1983 [DE] Fed. Rep. of Germany ....... 3336151

[51] Int. Cl.$^4$ ............................................. B65G 47/24
[52] U.S. Cl. ................................... 198/381; 198/406; 198/690.1; 414/88
[58] Field of Search ........................... 414/74, 75, 88; 198/690, 690.1, 381, 406

[56] References Cited

U.S. PATENT DOCUMENTS

| 2,428,103 | 9/1947 | Vergobbi | 198/406 |
| 2,795,340 | 6/1957 | Hommel | 414/74 X |
| 3,164,269 | 1/1965 | Roosevelt | 414/74 |
| 3,165,210 | 1/1965 | Mojden et al. | 414/74 X |
| 3,917,054 | 11/1975 | Hurst | 198/381 X |
| 4,391,560 | 7/1983 | Fardin | 198/406 X |

Primary Examiner—Joseph E. Valenza
Assistant Examiner—Janice Krizek
Attorney, Agent, or Firm—George A. Evans

[57] ABSTRACT

Apparatus is disclosed for feeding singled can lids from a conveyor to a spreader magnet buffer magazine, the can lids being made of magnetic material. The conveyor has an end roller made of magnetic material, the end roller being positioned adjacent to the magazine. Curved tracks are provided between the end roller and the magazine, the tracks serving to control the direction of movement of the can lids as they move from the end roller into the magazine.

4 Claims, 6 Drawing Figures

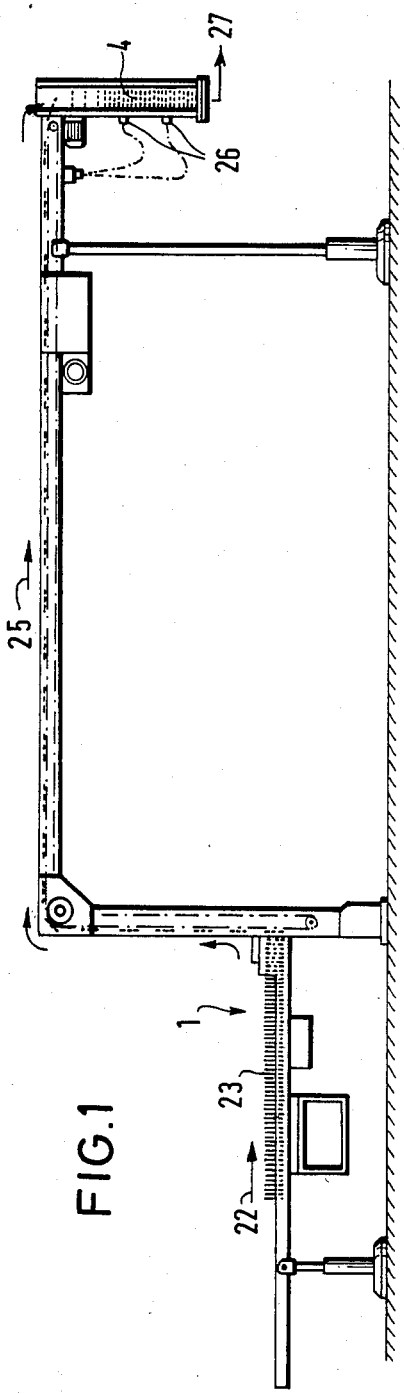
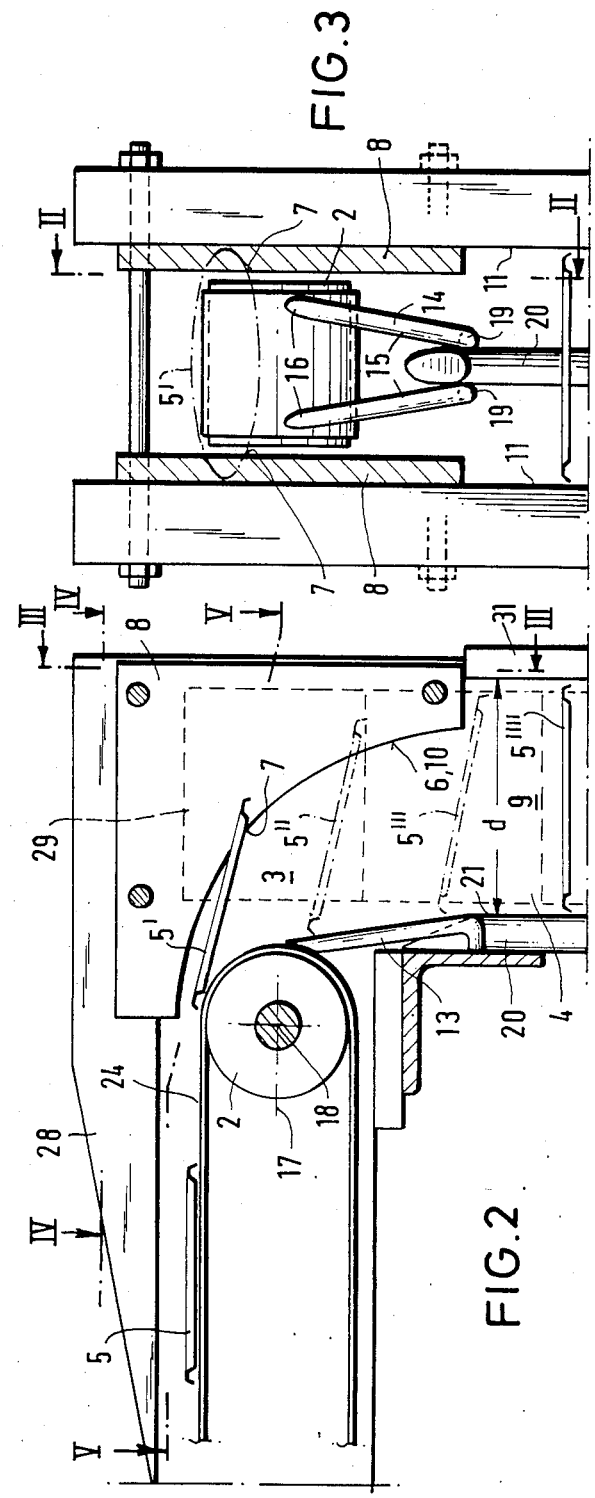

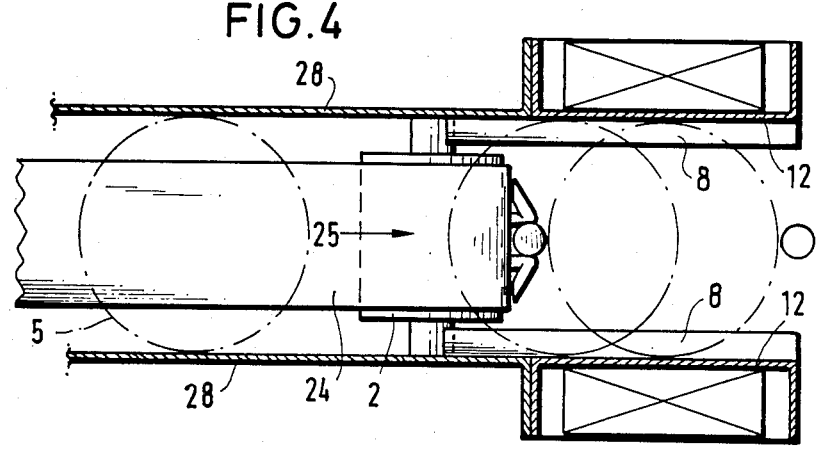
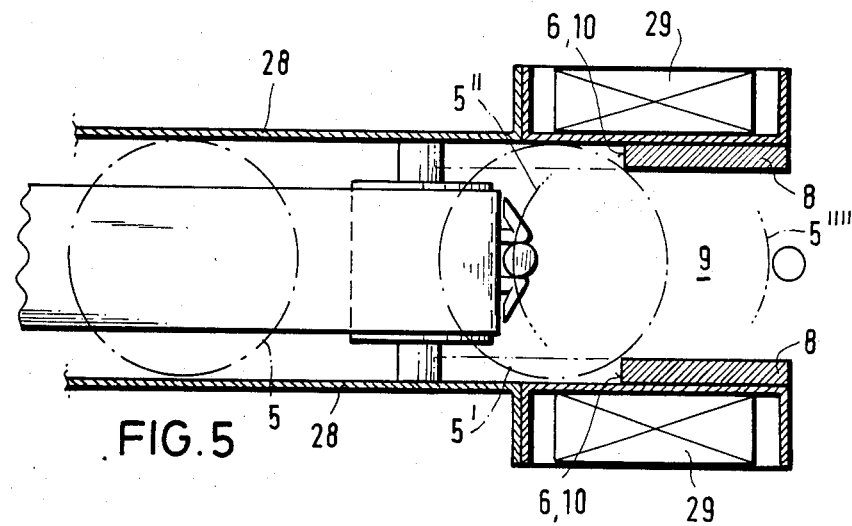

APPARATUS FOR FEEDING SINGLED DISC-SHAPED ELEMENTS

BACKGROUND TO THE INVENTION

This invention relates to apparatus for feeding singled disc-shaped magnetic elements, in particular can lids, from a conveyor to a spreader magnet buffer magazine.

In conveying can lids it is known to use a depalleting device to single the can lids as they are moved on pallets from a palleting machine. This singling operation is necessary for the further handling of the individual lids, for example for passing them to a turntable for their onward movement to a glueing machine or a sealing machine.

In a known machine, the singled can lids are passed by a conveyor belt into a spreader magnet buffer magazine. This magazine acts as a buffered store between the singling device and a reception device which passes them on for further treatment (for example to a glueing machine or sealing machine).

In order to reach the spreader magnet buffer magazine, the can lids must be turned, usually through about 90°, in relation to their direction of movement. This means that the inherently high kinetic energy of the can lids (which results from the high speed of the conveyor belt) must be eliminated in the shortest possible time, in order to enable the can lids to pass into the interior of the spreader magnet buffer magazine. For this purpose, the end of the conveyor belt, that is to say its end roller, is arranged at an appropriate distance upstream of the interior of the magazine, so that a funnel-like inlet opening is created. Shock-absorbing strips, such as pieces of cloth are provided on the internal wall of the magazine that is located opposite the end roller, so that the can lids, advancing at high speed, can be received with little shock.

Experience has shown that trouble occurs in the moving of the can lids in the zone of transfer from the conveyer belt to the magazine, particularly when the spacings between the lids are not satisfactorily maintained during singling and deposition of the lids on the conveyor belt. In particular, the known devices for receiving the lids in a shock-free manner are not suitable, in conjunction with the funnel-shaped inlet opening, to guide the lids reliably in the transfer zone. This is because, in this zone, which has a greater inside diameter than that of the magazine, the lids take up indefinite positions, that is to say they vibrate so that they cannot be accurately guided.

The aim of the invention is to provide feed apparatus which does not suffer from the above-described disadvantages, and which is suitable particularly for feeding can lids, but which can also be used for feeding other disc-like elements such as clutch discs.

The aim of the invention is, therefore, to enable singled can lids to be diverted safely into the magazine, without the occurrence of difficulties in conveying in the transfer zone where the lids change their direction of movement. It is intended that this should be achieved when, during the singling of the lids, these are deposited on the conveyor belt at differing distances apart, or when the lids are delivered to the spreader magnet buffer magazine in an overlapping or underlapping manner. Efficient feed is intended to be achived also when conveyor belt speeds greater than the normal are used.

SUMMARY OF THE INVENTION

The present invention provides apparatus for feeding singled disc-shaped magnetic elements from a conveyor to a spreader magnet buffer magazine, the conveyor having an end roller positioned adjacent to the magazine, wherein the end roller is a magnetic roller, and wherein curved track means are provided between the end roller and the magazine to control the direction of movement of the disc-shaped elements as they move from the end roller into the magazine.

The feed apparatus of the invention, therefore, does not require that, in the transfer zone, the delivered elements (can lids) have sufficient clearance (and therefore sufficient time) to become stabilised in the position imposed by the permanent magnets of the spreader magnet buffer magazine. Instead, the invention makes use of a positive guiding system. In a preferred embodiment of the invention, this positive guiding system is partly magnetic and partly mechanical. An important feature of the invention in this connection is that the end roller is positioned immediately adjacent to the inside diameter of the magazine. An element (can lid), therefore, has no opportunity of leaving the end roller without continuing to be guiding. Because of the magnetic field emanating from the end roller, the lid is controlled (and held) at its rear zone by said roller, whereas its leading edge is guided by the curved track means. This means that an element (lid), arriving at high speed on the conveyor belt, does not, as previously, have to be reduced to zero speed in an extremely sudden manner, that is to say the kinetic energy does not have to be completely absorbed. Instead, the element (lid) is gently slowed down by the arcuate path of the curved track means, and the retaining force of the magnetic end roller. The magnetic end roller pulls the trailing end of the element (can lid) in the downward direction, so that a stabilising effect as regards its position in space is also achieved here.

In a preferred embodiment, the curved track means is constituted by two curved tracks which are positioned so as to guide the leading edges of the disc-shaped elements, the two curved tracks being offset laterally to either side of the line along which the centres of the disc-shaped elements pass. The off-centre guiding results in stabilisation in the horizontal plane.

Advantageously, the curved tracks are supported by carriers made of non-magnetic material, the end faces of the carriers that are presented to the interior of the magazine and to the end roller defining the curved tracks. Preferably, the carriers are in the form of plates, and are made of plastics material.

In a preferred embodiment, the carriers are detachably mounted on the inner walls of the magazine, so that the carriers can be removed and replaced. This detachable mounting can be achieved by means of screw connections. This is advantageous, since the carriers (which are of necessity subjected to a certain amount of wear) can then be adjusted according to the degree of wear.

The positive feeding of the elements (can lids) calls for a specific distance between the end roller and the curved track means. Preferably, the curved tracks are such that, as a disc-shaped element leaves the end roller, it is forced to take up a position in which its leading end is slightly downwardly inclined. Experience has shown that, given positive guiding of this kind, the transfer of the elements (can lids) into the zone stabilised by the permanent magnets takes place in the best possible manner.

Advantageously, the apparatus further comprises a deflector. Preferably, the deflector is constituted by a bifurcated element having two diverging limbs whose more widely-spaced free ends are located approximately in the plane of the axis of the end roller and extend tangentially thereto, and whose more closely-spaced ends are arranged on a guide rod associated with the magazine and flush with a guiding edge of said rod. Conveniently, the deflector is made of non-magnetic material.

The deflector ensures that, when an element (can lid) passes over the magnetic end roller, its trailing edge is drawn in the downward direction approximately as far as the zone of the axis of the magnetic end roller, and is at the same time held back; but, after leaving this position, its rear edge can fall freely downwards, whereas a slight retaining effect is still provided in its forward edge because of the friction on the curved track. Since the leading edge of the element (lid) is tilted slightly downwards, this likewise contributes to the stabilisation of the element in the required position.

The bifurcated form of the deflector is particularly advantageous, since the element (lid) can contact the deflector at practically any point therealong (for example halfway along), that is to say a precisely defined approach edge is not necessary. A further advantage of the deflector is that retraction of conveyed elements (can lids) into the lower run of the conveyor belt, when the belt is moving slowly and on account of the magnetic action of the end roller, is reliably prevented.

The important idea underlying the invention is that of making the end roller of magnetic material, and of exploiting the effect thus achieved. A further advantage accrues from providing definite curved tracks for guiding the leading edges of the elements. This is preferably achieved by means of a mechanical guide or guides. However, it is within the ambit of the invention for the curved track means to be created by the electrical fields of at least one electromagnet, which fields determine the controllable line of the curved direction of movement of the disc-shaped elements. The curved track means may also be formed by the fields of suitably arranged permanent magnets.

BRIEF DESCRIPTION OF THE DRAWINGS

Feed apparatus constructed in accordance with the invention will now be described, by way of example, with reference to the accompanying drawings, in which:

FIG. 1 is a diagrammatic side elevation of the apparatus;

FIG. 2 is a cross-section taken on the line II—II of FIG. 3;

FIG. 3 is a cross-section taken on line III—III of FIG. 2;

FIG. 4 is a cross-section taken on the line IV—IV of FIG. 2;

FIG. 5 is a cross-section taken on the line V—V of FIG. 2; and

DESCRIPTION OF PREFERRED EMBODIMENT

Figure 6:
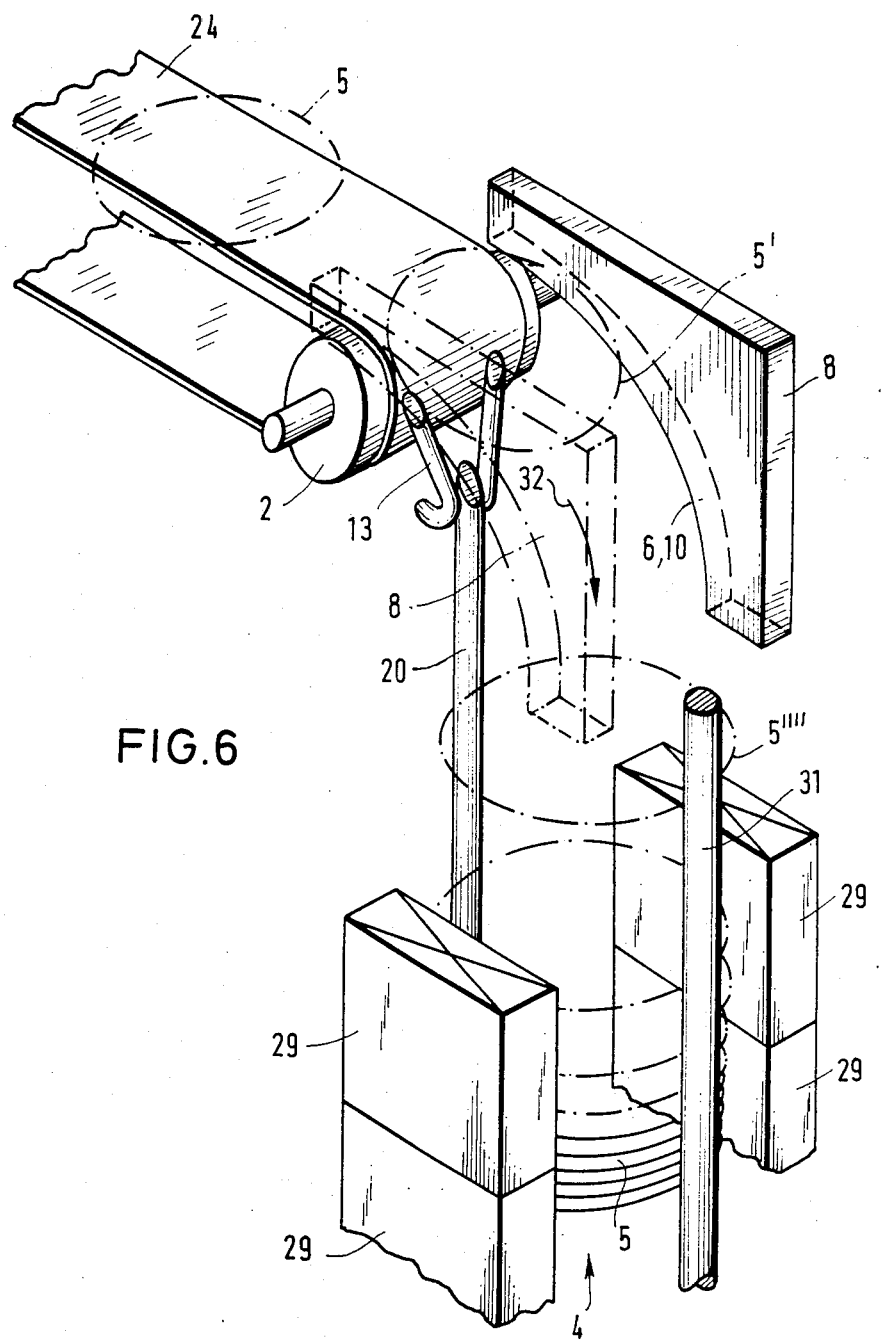
FIG. 6 is a perspective view, on an enlarged scale, of part of the apparatus.

Referring to the drawings, FIG. 1 illustrates diagrammatically singling equipment 1 for singling can lids 5 (see FIG. 2) from a row 23 of lids being transported in the direction of the arrow 22. The lids 5 are fed, in the direction of the arrow 25, on a conveyor belt 24 to a spreader magnet buffer magazine 4. Sensors 26 are provided to indicate the state of fill of the spreader magnet buffer magazine 4, so that onward movement of the lids 5, in the direction indicated by the arrow 27, to a turntable or the like (not shown), and then to a glueing machine, sealing machine or other equipment (not shown), can proceed in a controlled manner.

As can be seen from FIGS. 2, 4 and 5, lateral, non-magnetic guides 28 for the lids 5 are provided in the zone of transfer from the end roller 2 of the conveyor 24 to the interior 9 of the spreader magnet buffer magazine 4. The roller 2 is made of magnetic material.

In the lower part of the interior 9 of the spreader magnet buffer magazine 4, the stored can lids 5 are positionally stabilised by permanent magnets 29. The stabilising magnets 29 extend to a level above the zone of the conveyor end roller 2 (see FIG. 2).

Two carriers 8 are secured to the inner faces 11 of the walls 12 defining the interior 9 of the magazine 4. The walls 12 are components of a housing which accommodates the stabilising magnets 29. The carriers 8 are made of plastics material, are in the form of plates, and they support curved tracks 6, which extend towards the conveyor end roller 2 and the magazine interior 9. As can be seen best in FIGS. 3 and 6, the carriers (and therefore the curved tracks 6) are arranged off-centre on the right and on the left.

As shown in FIGS. 2, 4 and 5, a can lid 5 arriving on the conveyor belt 24 in the direction of the arrow 25, first takes up the position 5' as it moves over the conveyor end roller 2. As this happens, the leading edge (see also FIG. 3) of the lid bears against the two lateral curved tracks 6. The distance between the shaft 18 of the conveyor end roller 2 and the curved tracks 6 (that is to say the end faces 10 of the carriers 8) is such that the leading edge of the can lid assumes a downwardly inclined position (see FIG. 2). This position is also maintained when the lid leaves the magnetic end roller 2 and passes through the positions 5" and 5''' (see FIG. 2).

When the trailing edge of the can lid has left the plane 17 extending approximately through the shaft 18 of the conveyor end roller 2, the guiding function is taken over by a non-magnetic deflector 13. This delfector 13 is constituted by a bifurcated member 14 (see FIGS. 3 and 6) having two diverging limbs 15. The free (more widely spaced) ends 16 of the limbs 15 are located approximately in the plane 17. The more closely spaced ends 19 of the limbs 15 are solidly connected to a rear guide rod 20, and lead the trailing edge of the can lid into the zone of a guiding edge 21 of the rear guide rod. In this position the can lid is substantially horizontal, as shown by the position 5'''' (see FIGS. 2 and 6). As can also be seen in FIG. 2, the conveyor end roller 2 directly adjoins the inside diameter d of the magazine interior 9.

The various positions 5' to 5'''', which the can lid 5 occupies as it changes its direction of movement, are represented in FIGS. 4 and 5 by means of the same reference numerals.

FIG. 6 provides a perspective illustration of the change in the direction of movement, and the components required for this purpose. To make the illustration clearer the housing accommodating the stabilising magnets 29, as well as the non-magnetic guides 28 and the further lateral confines of the conveyor belt 24 have been omitted. Also, the stabilising magnets 29 are not shown in their full height as seen in FIG. 2. It will be seen, however, that the stabilising magnets 29 stabilise the can lids in a precisely horizontal attitude, approximately in the position 5'''' (see also FIG. 2), so that additional positive guiding by curved tracks is not necessary. Whereas the can lids are laterally fixed in position by the stabilising magnets 29, the rear and front guiding is achieved by means of the rear guide rod 20 and a front guide rod 31. The can lid 5, therefore, leaves its horizontal position (during movement in the direction indicated by the arrow 32) only to a slight extent, in the sense that the leading edge is inclined slightly downwardly, this being intended and occurring in a controlled manner.

I claim:

1. Apparatus for feeding singled disc-shaped magnetic elements having forward and trailing ends to a spreader magnet buffer receiving magazine which comprises a power driven conveyor means for transporting the elements in a transport direction, said conveyor means having a magnetic end roller having a rotational axis arranged adjacent the receiving magazine and a belt trained around said end roller for transporting the elements while they are lying flat on the conveyor belt, means for driving the conveyor means causing an element passing over the end roller to continue travel in substantially the same transport direction while its forward end loses contact with the conveyor belt, a curved track arranged to engage said forward end after it loses contact with the conveyor belt, and a deflector whose upper end is located approximately in a horizontal plane of the rotational axis of the end roller and tangentially thereto, said deflector being arranged to engage the trailing end of the element as it leaves the conveyor belt and prior to the element losing contact with said curved track.

2. Apparatus as set forth in claim 1 in which the curved track comprises a pair of members each of which is offset laterally to either side of the line along which the centers of the elements pass, said members being arranged to engage the forward end of the element to cause it to decline while its trailing end is still contacting the portion of the conveyor belt passing over the end roller.

3. Apparatus as set forth in claim 1 in which the deflector for receiving elements from the conveyor comprises two diverging members whose more widely spaced ends are located approximately in the plane of the axis of the end roller.

4. Apparatus as set forth in claim 1 in which the curved track and the deflector are of nonmagnetic material.

* * * * *